United States Patent [19]

Marsi

[11] Patent Number: 4,648,605
[45] Date of Patent: Mar. 10, 1987

[54] MECHANICAL SEAL ASSEMBLY

[75] Inventor: Joseph A. Marsi, Rancho Palos Verdes, Calif.

[73] Assignee: Borg-Warner Corporation, Chicago, Ill.

[21] Appl. No.: 341,408

[22] Filed: Jan. 21, 1982

Related U.S. Application Data

[63] Continuation of Ser. No. 196,967, Oct. 14, 1980, abandoned.

[51] Int. Cl.$^4$ ............................ F16J 3/02; F16J 15/52
[52] U.S. Cl. ......................................... 277/89; 277/88; 277/93 SD
[58] Field of Search ..................... 277/88, 89, 90, 93, 277/93 R, 93 SD

[56] References Cited

U.S. PATENT DOCUMENTS

| | | | |
|---|---|---|---|
| 2,447,663 | 8/1948 | Payne | 277/89 |
| 2,512,749 | 6/1950 | McCloskey | 277/88 |
| 2,859,988 | 11/1958 | Payne | 277/90 |
| 2,881,014 | 4/1959 | Amirault et al. | 277/89 |
| 2,912,265 | 11/1959 | Brummer | 277/88 |

FOREIGN PATENT DOCUMENTS 564659 10/1958 Canada ................................... 277/89

Primary Examiner—Allan N. Shoap
Attorney, Agent, or Firm—Aubrey L. Burgess

[57] ABSTRACT

A mechanical seal assembly especially adaptable for use in the chemical industry in which a jacket impervious to the chemical involved surrounds a spring means which urges the seal faces toward one another, the spring being capable of transmitting torque and provides axial support to the jacket.

3 Claims, 1 Drawing Figure

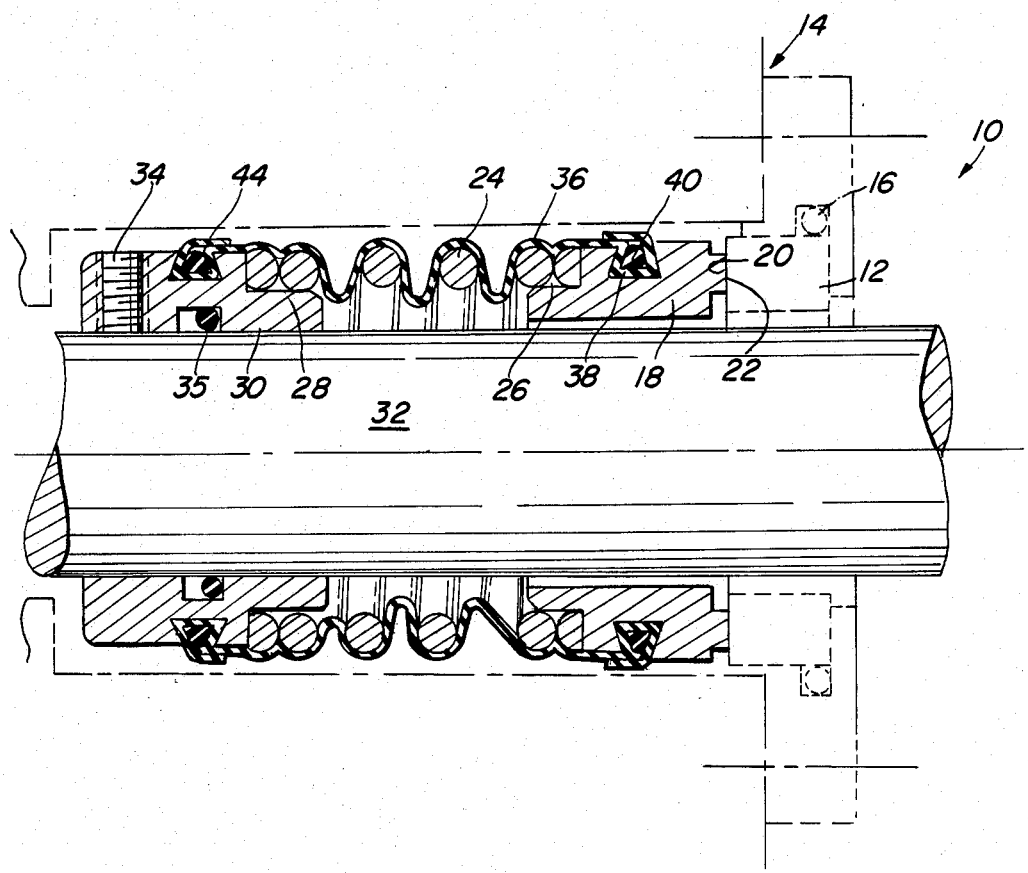

MECHANICAL SEAL ASSEMBLY

This is a continuation of application Ser. No. 196,967 filed Oct. 14, 1980, now abandoned.

BACKGROUND OF THE INVENTION

Mechanical seal assemblies for sealing fluids from each other and associated with a stationary housing and a rotatable shaft are well known in the art The housing may house a pump impeller connected to the rotatable shaft. To substantially eliminate leakage of the pump fluid from the housing, a mechanical seal assembly is used. Generally these mechanical seal assemblies comprise a seal ring connected to the housing and a seal ring connected to the shaft, the rings having opposing seal faces one or both of which are resiliently urged toward the other. Such construction can leave the resilient means exposed to one of the fluids—i.e., (1) fluid being pumped and (2) air or other fluid. If the fluid being pumped is chemically active, it can corrode and damage the resilient means and/or other parts of the assembly.

SUMMARY OF THE INVENTION

A mechanical seal assembly is disclosed herein constructed especially for use in chemical applications where corrosive fluids are handled and in which a chemically impervious covering is used to protect various parts of the assembly from contact with the corrosive fluids. Specifically, the assembly comprises a conventional rotatable and stationary seal rings of a coil spring for urging the rings toward one another. Preferably, a heat shrinkable plastic tubing surrounds the spring and is sealed at one end of the spring retainer and at the other end to a seal ring, the tubing being of a fluor-ethylene-propylene material. Other elastomers may be used to encase the spring, in which case other methods of joining the sleeve or jacket to the end pieces would be necessary.

DRAWINGS OF THE INVENTION

The single FIGURE is a longitudinal, partial sectional view of a mechanical seal assembly according to this invention.

DETAILED DESCRIPTION OF THE INVENTION

The mechanical seal assembly is generally identified as 10 and comprises a stationary seal ring 12 sealed to a multiple part housing 14 by an O-ring 16 and a rotatable seal ring 18 the rings 12 and 18 having opposed seal faces 20 and 22, respectively. The seal ring 18 is urged toward the seal ring 12 by a coil spring 24, one end of which surrounds and frictionally engages a reduced portion of the ring 18 and the other end of which surrounds and frictionally engages a reduced portion 20 of a spring retainer 30, the latter being adapted to be connected to a rotatable shaft 32 by a set screw 34 and sealed thereto by an O-ring 35. Because of the connection of the retainer 32 with the shaft 32 and the spring 24, the seal ring 18 is rotatable with the shaft 32.

A sleeve or jacket 36 surrounds the spring 24 and extends over parts of the seal ring 18 and the spring retainer 30. One end of the sleeve 36 is received in an annular groove 38 in the ring 18 and is fixed therein by an O-ring 40. The other end of the sleeve 36 is received in an annular groove 42 in the retainer 30 and is fixed therein by an O-ring 44.

Preferably the sleeve 36 comprises a heat shrinkable tubing of a fluor-ethylene-propylene (FEP). A portion of the seal 10 can be constructed as a cartridge, i.e., a retainer 30, a seal ring 18 and a spring can be assembled in a mandrel. A length of FEP tubing is slipped over the assembled parts followed by assemblying the O-rings 40 and 44 in the appropriate grooves 38, and 42, respectively. Warm air is then directed onto the tubing which causes it to shrink and assume the shape as shown in the drawing. The parts can then be removed from the mandrel for future assembly with a seal ring 12.

For high pressure uses, multiple ply sleeves or jackets can used.

It is to be understood that other elastomers may be used to encase the spring 24, in which case other methods of joining the sleeve or jacket to the end pieces would be necessary. The spring 24 serves to radially support the sleeve or jacket and enables the seal assembly to be used at much higher pressures than in the absence of such radial support.

I claim:

1. A mechanical seal assembly especially adaptable for use in the chemical industry and which is associated with a rotatable shaft and a stationary housing which may contain chemically active fluid, comprising:

a stationary seal ring connected to said housing;
a rotatable seal ring connected to said shaft;
seal faces on said seal rings opposed to one another;
a support connected to said shaft and spaced from said rotatable seal ring;
spring means positioned between said rotatable seal ring and said support for urging said rotatable seal ring toward said stationary seal ring;
an axially extending fluid impervious jacket surrounding said spring means;
said jacket having end portions extending over portions of said rotatable seal ring and said support and being separate from and supported by said spring means;
said jacket comprising shrinkable plastic shrunk onto said spring means; and
means encircling each end portion of said jacket to seal the end portions respectively to said rotatable seal ring and to said support.

2. The mechanical seal assembly as recited in claim 1 wherein said encircling means comprise O-rings.

3. A mechanical seal assembly especially adaptable for use with chemically active fluids and comprising:

a stationary seal ring adapted to be connected to a housing;
a rotatable seal ring adapted to be connected to a rotatable shaft;
said seal rings having faces opposed to one another;
a coil spring urging said rotatable seal ring toward said stationary seal ring;
a retainer adapted to be connected to the rotatable shaft for positioning one end of said spring;
a fluid impervious jacket surrounding and separate from and supported by the outside of said spring; and
means sealing the ends of said jacket to said retainer and said rotatable seal ring
said fluid impervious jacket comprising a fluorethylenepropylene plastic shrunk onto said spring;
said means sealing the ends of said jacket to said retainer and said rotatable seal ring comprising O-rings around said jacket and received in grooves in said retainer and said rotatable seal ring, respectively.

* * * * *